US011954572B2

(12) United States Patent
Hagen et al.

(10) Patent No.: US 11,954,572 B2
(45) **Date of Patent: *Apr. 9, 2024**

(54) OPTIMIZING TRAINING DATA FOR IMAGE CLASSIFICATION

(71) Applicant: Home Depot Product Authority, LLC, Atlanta, GA (US)

(72) Inventors: Matthew Hagen, Atlanta, GA (US); Estelle Afshar, Atlanta, GA (US); Huiming Qu, Atlanta, GA (US); Ala Eddine Ayadi, Atlanta, GA (US); Jiaqi Wang, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,048

(22) Filed: May 16, 2023

(65) Prior Publication Data

US 2024/0070554 A1 Feb. 29, 2024

Related U.S. Application Data

(63) Continuation of application No. 16/894,344, filed on Jun. 5, 2020, now Pat. No. 11,687,841.

(Continued)

(51) Int. Cl.

| | |
|---|---|
| ***G06N 20/20*** | (2019.01) |
| ***G06F 18/21*** | (2023.01) |

(Continued)

(52) U.S. Cl.

CPC ......... *G06N 20/20* (2019.01); *G06F 18/2148* (2023.01); *G06F 18/2155* (2023.01);

(Continued)

(58) Field of Classification Search

None

See application file for complete search history.

(56) References Cited

U.S. PATENT DOCUMENTS

| | | |
|---|---|---|
| 9,704,054 B1 | 7/2017 | Tappen et al. |
| 11,182,424 B2 | 11/2021 | Marali |

(Continued)

FOREIGN PATENT DOCUMENTS

| | | |
|---|---|---|
| WO | 2017191648 A1 | 11/2017 |

OTHER PUBLICATIONS

Han Altae-Tran, Bharath Ramsundar, Aneesh S. Pappu, and Vijay Pande. 2017. Low data drug discovery with one-shot learning. ACS central science 3, 4 (2017), 283-293.

(Continued)

*Primary Examiner* — David Perlman

(74) *Attorney, Agent, or Firm* — Greenberg Traurig, LLP

(57) ABSTRACT

A method for machine learning-based classification may include training a machine learning model with a full training data set, the full training data set comprising a plurality of data points, to generate a first model state of the machine learning model, generating respective embeddings for the data points in the full training data set with the first model state of the machine learning model, applying a clustering algorithm to the respective embeddings to generate one or more clusters of the embeddings, identifying outlier embeddings from the one or more clusters of the embeddings, generating a reduced training data set comprising the full training data set less the data points associated with the outlier embeddings, training the machine learning model with the reduced training data set to a second model state, and applying the second model state to one or more data sets to classify the one or more data sets.

20 Claims, 7 Drawing Sheets

Related U.S. Application Data

(60) Provisional application No. 62/858,111, filed on Jun. 6, 2019.

(51) Int. Cl.

| | |
|---|---|
| ***G06F 18/214*** | (2023.01) |
| ***G06F 18/23*** | (2023.01) |
| ***G06N 20/00*** | (2019.01) |
| ***G06V 10/762*** | (2022.01) |
| ***G06V 10/764*** | (2022.01) |
| ***G06V 10/774*** | (2022.01) |
| ***G06V 10/82*** | (2022.01) |

(52) U.S. Cl.

CPC ............ *G06F 18/217* (2023.01); *G06F 18/23* (2023.01); *G06N 20/00* (2019.01); *G06V 10/763* (2022.01); *G06V 10/764* (2022.01); *G06V 10/7747* (2022.01); *G06V 10/82* (2022.01)

(56) References Cited

U.S. PATENT DOCUMENTS

| | | | |
|---|---|---|---|
| 2008/0118124 | A1 | 5/2008 | Madabhushi et al. |
| 2016/0283784 | A1 | 9/2016 | Kounavis et al. |
| 2018/0174001 | A1 | 6/2018 | Kang |
| 2018/0242906 | A1 | 8/2018 | Madabhushi et al. |
| 2018/0300576 | A1 | 10/2018 | Dalyac et al. |
| 2020/0265218 | A1 | 8/2020 | Dai et al. |

OTHER PUBLICATIONS

Bjorn Barz and Joachim Denzler. 2018. Hierarchy-based Image Embeddings for Semantic Image Retrieval. CoRR abs/1809.09924 (2018). arXiv:1809.09924 hlip://arxiv.org/abs/1809.09924.

Tianqi Chen and Carlos Guestrin. 2016. Xgboost: A scalable tree boosting system. In Proceedings of the 22nd acm sigkdd international conference on knowledge discovery and data mining. ACM, 785-794.

Brian Chu, Vashisht Madhavan, Oscar Beijbom, Judy Hoffman, and Trevor Darrell. 2016. Best practices for fine-tuning visual classifiers to new domains. In European conference on computer vision. Springer, 435-442.

Thomas M. Cover, Peter E. Hart, et al. 1967. Nearest neighbor pattern classification. IEEE transactions on information theory 13, 1 (1967), 21-27.

Jia Deng, Wei Dong, Richard Sacher, Li-JiaLi, Kai Li, and Li Fei-Fei. 2009. Imagenet: A large-scale hierarchical image database. In 2009 IEEE conference on computer vision and pattern recognition. Ieee, 248-255.

John Flynn, Ivan Neulander, James Philbin, and Noah Snavely. 2015. DeepStereo: Learning to Predict New Views from the World's Imagery. CoRR abs/1506.06825 (2015). arXiv:1506.06825 http://arxiv.org/abs/1506.06825.

Kaiming He, Xiangyu Zhang, Shaoqing Ren, andJian Sun. 2016. Deep residual learning for image recognition. In Proceedings of the IEEE conference on computer vision and pattern recognition. 770-778.

Alexander Hermans, Lucas Beyer, and Bastian Leibe. 2017. In defense of the triplet loss for person re-identification. arXiv preprint arXiv:1703.07737 (2017).

Gregory Koch. 2015. Siamese neural networks for one-shot image recognition.

Alex Krizhevsky, Ilya Sutskever, and Geoffrey E Hinton. 2012. Imagenet classification with deep convolutional neural networks. In Advances in neural information processing systems. 1097-1105.

Liuwuli, Runwei Situ,Junyan Gao, Zhenguo Yang, and WenyinLiu. 2017. A hybrid model combining convolutional neural network with xgboost for predicting social media popularity. In Proceedings of the 25th ACM international conference on Multimedia. ACM, 1912-1917.

Tsung-Yu Lin, Aruni RoyChowdhury, and Subhransu Maji. 2015. Bilinear cnn models for fine-grained visual recognition. In Proceedings of the IEEE international conference on computer vision. 1449-1457.

Laurens van der Maaten and Geoffrey Hinton. 2008. Visualizing data using t-SNE. Journal of machine learning research Nov. 9, 2008, 2579-2605.

James MacQueen et al. 1967. Some methods for classification and analysis of multivariate observations.

Gautam Malu, Raju S. Bapi, and Bipin Indurkhya. 2017. Learning Photography Aesthetics with Deep CNNs. CoRR abs/1707.03981 (2017). arXiv:1707.03981 http://arxiv.org/abs/1707.03981.

Mohammad Moghimi, Mohammad Saberian, Jian Yang, Li-Jia Li, Nuno Vasconce-Ios, and Serge Belongie. [n.d.]. Boosted Convolutional Neural Networks. ([n. d.]).

Xudie Ren, Haonan Guo, Shenghong Li, Shilin Wang, and Jianhua Li. 2017. A novel image classification method with CNN-XGBoost model. In International Workshop on Digital Watermarking. Springer, 378-390.

Olga Russakovsky, Jia Deng, Hao Su, Jonathan Krause, Sanjeev Satheesh, Sean Ma, Zhiheng Huang, Andrej Karpathy, Aditya Khosla, Michael Bernstein, et al. 2015. Imagenet large scale visual recognition challenge. International journal of computer vision 115, 3 (2015), 211-252.

Jorg Sander, Martin Ester, Hans-Peter Kriegel, and Xiaowei Xu. 1998. Density-based clustering in spatial databases: The algorithm gdbscan and its applications. Data mining and knowledge discovery 2, 2 (1998), 169-194.

Florian Schroff, Dmitry Kalenichenko, and James Philbin. 2015. Facenet: A unified embedding for face recognition and clustering. In Proceedings of the IEEE conference on computer vision and pattern recognition. 815-823.

Rishab Sharma and Anirudha Vishvakarma. 2019. Retrieving Similar E-Commerce Images Using Deep Learning. CoRR abs/1901.03546 (2019). arXiv:1901.03546 http://arxiv.org/abs/1901.03546.

Nima Tajbakhsh, Jae Y. Shin, Suryakanth R Gurudu, R. Todd Hurst, Christopher B Kendall, Michael B. Gotway, and Jianming Liang. 2016. Convolutional neural net-works for medical image analysis: Full training or fine tuning? IEEE transactions on medical imaging 35, 5 (2016), 1299-1312.

Hao Tang, Wei Wang, Songsong Wu, Xinya Chen, Dan Xu, Nicu Sebe, and Yan Yan. 2019. Expression Conditional GAN for Facial Expression-to-Expression Translation.

Jason Yosinski, Jeff Clune, Yoshua Bengio, and Hod Lipson. 2014. How transferable are features in deep neural networks?. In Advances in neural information processing systems. 3320-3328.

ISA/US, International Search Report and Written Opinion issued in PCT/US2020/036408 (212PCT2), dated Aug. 12, 2020, 18 pgs.

OPTIMIZING TRAINING DATA FOR IMAGE CLASSIFICATION

CROSS-REFERENCE TO RELATED APPLICATIONS

This application is a Continuation of pending U.S. application Ser. No. 16/894,344, entitled "OPTIMIZING TRAINING DATA FOR IMAGE CLASSIFICATION," filed Jun. 5, 2020, the contents of which are incorporated herein for all purposes and in its entirety.

TECHNICAL FIELD

This disclosure generally relates to training machine learning tools, including optimization of training data for machine learning tools.

BACKGROUND

Machine learning models for identification and classification of features are generally trained on a set of training data, which training data may include positive and/or negative examples of the feature that the model is intended to identify and classify.

DETAILED DESCRIPTION

Known machine learning algorithm training methods typically do not adequately optimize a training data set. The training data may include examples that are less representative of the characteristics of the items to be classified than other examples in the data set—in some cases, significantly less representative. Such low-representativeness examples may be detrimental to the performance of the performance of the trained model if they are used to repeatedly train the model because they may introduce ambiguity or outright errors to the training process. Eliminating such examples from the training data set, as described herein, may improve the precision of the resulting machine-learning-trained model.

Figure 1:
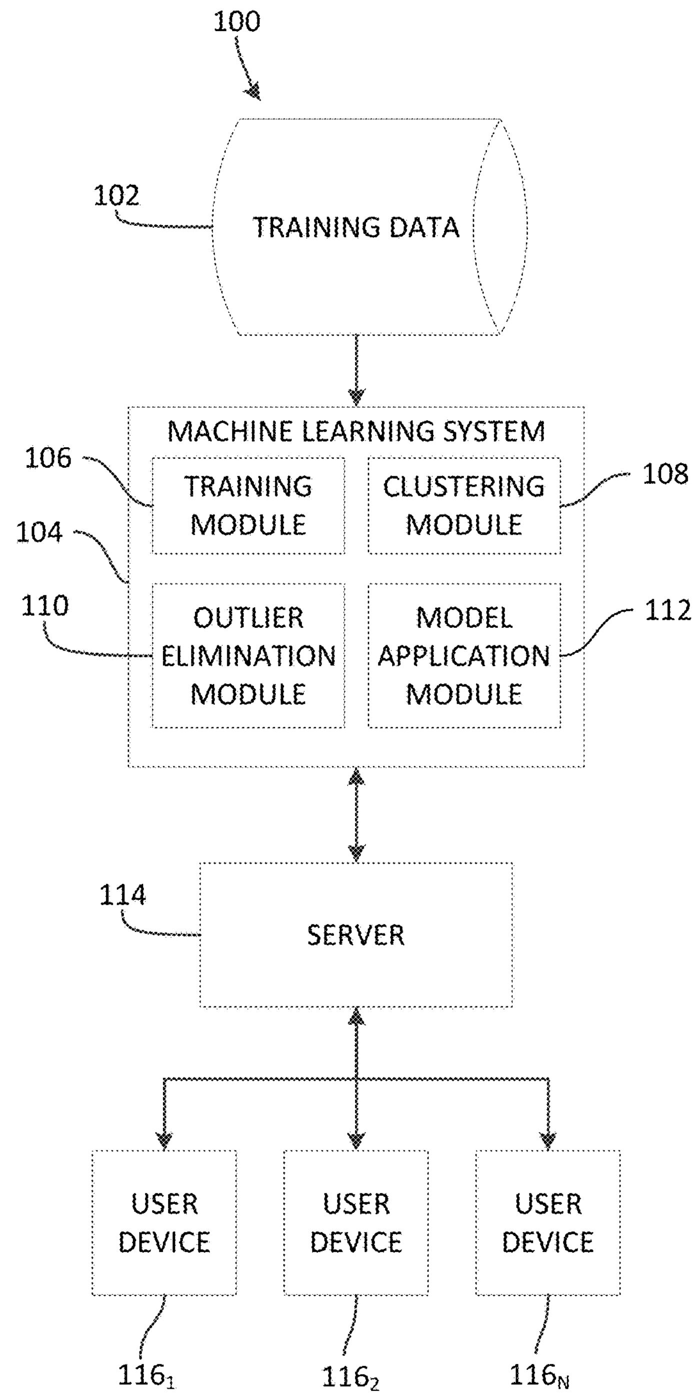
FIG. 1 is a diagrammatic view of an example system for developing and applying a machine learning model for evaluating a data set.

Referring now to the drawings, wherein like numerals refer to the same or similar features in the various views, FIG. 1 is a diagrammatic view of an example system 100 for developing and applying a machine learning model for evaluating a data set. The system 100 may be used to develop and apply a machine learning model for classifying images, for example, which classified images may be displayed to users, for example.

The system 100 may include a database 102 of training data and a machine learning system 104 that may include one or more functional modules 106, 108, 110, 112 embodied in hardware and/or software. In an embodiment, the functional modules 106, 108, 110, 112 of the machine learning system 104 may be embodied in a processor and a memory storing instructions that, when executed by the processor, cause the processor to perform the functionality of one or more of the functional modules and/or other functionality of this disclosure.

The functional modules 106, 108, 110, 112 of the machine learning system 104 may include a training module 106 that is configured to train one or more machine learning tools using training data obtained from the database 102 or another store of training data. The training data may be images, in some embodiments. In other embodiments, the training data may be text or other data. The training module 106 may train one or more types of machine learning tools, such as a convolution neural network (CNN) or other machine learning tool type. The training module may utilize a supervised learning process, in some embodiments, in which the training data consists of positive (and, in some embodiments, negative) examples of the feature or features that the machine learning tool is intended to identify.

In some embodiments, the training module 106 may be configured to train a machine learning tool in two stages. A first training stage may be conducted based on a full set of training data, and a second stage may be conducted on a reduced set of training data that is a subset of the full training data set, after identifying and eliminating certain data points from the full training data set, as described in this disclosure. In some embodiments, the training data set may be iteratively reduced in successive training epochs until a classification accuracy threshold is reached by the model.

A clustering module 108 may be provided in the machine learning system 104 and may be configured to apply one or more distance learning and/or clustering algorithms to the training data to cluster the training data into categories. The distance learning algorithm may be applied to the training data to improves the embeddings of the training data to have a better separability between classes and a better similarity within each class. The distance learning algorithm may include a Siamese neural network, for example. The clustering algorithm may be applied to the output of the distance learning algorithm, in some embodiments, to determine class-based clustered training data. The clustering of the resulting data points may reflect the precision of the machine learning tool after the first training stage.

The machine learning system 104 may also include an outlier elimination module 110 that may be configured to identify and eliminate outliers from the clustered training data. Outliers may be identified and eliminated on a holistic basis (i.e., data points that are remote from any cluster may be identified and eliminated), or on a class-by-class basis (i.e., data points that are given a particular class, but are remote from a cluster associated with that class, may be identified and eliminated). As used herein, the term "elimination" of a data point refers to removing the training data associated with that data point from further use in training of one or more machine learning tools, so as to create a reduced training data set.

A model application module 112 of the machine learning system 104 may be configured to apply the trained machine learning tool—referred to herein, once trained, as a model or classification model—to a data set to classify the data in that data set. For example, the classification model may be applied to one or more product images to classify the angle of the product in the image (e.g., front-facing, left-facing, etc.). Alternatively, in another example, the classification model may be applied to one or more product images or descriptions to classify the products themselves (e.g., to identify if the products, based on the images and/or text, include one or more features, or to determine a category of the product, and the like). Alternatively, in another example, the classification model may be applied to one or more product images or descriptions to classify a visual pattern of the product. The above-noted applications of the classification model are examples only, and numerous other applications are possible and contemplated.

The system 100 may further include a server 114 in electronic communication with the machine learning system 104 and with a plurality of user computing devices $\mathbf{116}_1$, $\mathbf{116}_2$, . . . $\mathbf{116}_N$. The server 114 may provide a website, data for a mobile application, or other interface through which the users of the user computing devices 116 may view data classified based on the above-noted functionality of the machine learning system 104. For example, the server 114 may provide an e-commerce website of a retailer that includes listings for one or more products, which listings may include product images and/or information that has been classified according to the machine learning system 104, which classification may be more accurate and/or more comprehensive than other classification methods. As a result, the machine learning system 104 may improve the user experience on the server-provided interface. Furthermore, by reducing the training data set and eliminating outlier training data points, the machine learning system 104 may improve the efficiency of the machine learning process and improve the classification precision of the resulting model.

Figure 2:
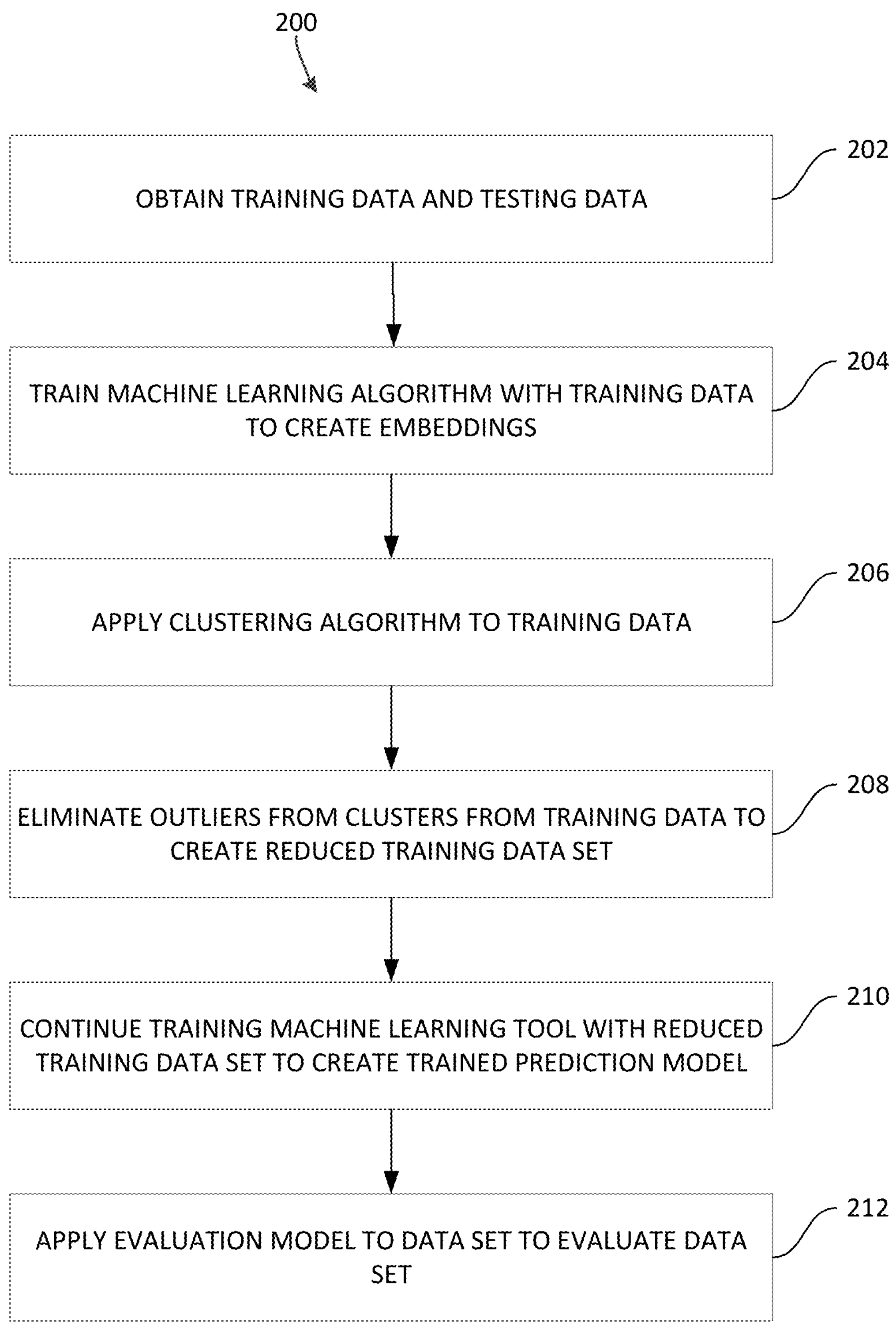
FIG. 2 is a flow chart illustrating an example method of developing and applying a machine learning model for evaluating a data set.

FIG. 2 is a flow chart illustrating an example method 200 of training and applying a machine learning tool. Referring to FIGS. 1 and 2, the method 200, or one or more portions thereof, may be performed by the machine learning system 100.

The method 200 may include a step 202 that includes obtaining training data and testing data. Both the training data and the testing data may include a plurality of data points and may be obtained from a labeled set stored in a database or other data store. Each data point in the training data may include a paired example (e.g., an image) and classification or category for that example. In some embodiments, the training data may include a set of positive and negative examples of a particular feature or characteristic that a machine learning model is intended to identify or classify. The training data may include images and/or text, voice or other signals, in some embodiments. The testing data may include similar data to the training data, but may be different (e.g., non-overlapping) data from the training data, in some embodiments. The training data obtained at step 202 may be a full training data set that may be reduced as described in further steps of the method 200.

The method 200 may further include a step 204 that includes training a machine learning algorithm with the training data (e.g., the full training data set) to create embeddings. The machine learning algorithm or tool may be a neural network, such as a CNN or RNN, in some embodiments. The machine learning algorithm may be trained with the full set of training data until such training no longer improves the machine learning tool, in an embodiment. The machine learning algorithm or tool may be trained to generate a representation (embeddings) of the original signal (i.e., image or other data) that may be efficiently used to classify the signal. Step 204 may result in both a first model state generated by application of the algorithm to the full training data set, and a set of embeddings generated by application of the first model state to the full training data set.

The method 200 may further include a step 206 that includes applying a clustering algorithm to the training data. The clustering algorithm, DB Scan for example, may be applied to the output of the machine learning tool after completing step 204, given the full training data as input, in some embodiments. The output of the clustering algorithm may be a data set comprising one or more classification clusters, based on the classification(s) that the machine learning tool is intended to output.

In some embodiments, before the clustering algorithm, a distance learning algorithm may be applied to the embeddings generated at step 204 to improves the separability between classes and similarity within classes. The distance learning algorithm may include a Siamese neural network, for example. Following application of the distance learning algorithm, the embeddings respective of the full training data set may be a distanced embeddings set. In such embodiments, the clustering algorithm may be applied to the distanced embeddings set.

The method 200 may further include a step 208 that includes identifying and eliminating outliers from the clusters from the training data set to generate a reduced training data set. That is, the reduced training data set may be the full training data set less the data points associated with identified outliers, for example. Outliers may be identified and eliminated on a holistic basis (i.e., data points that are remote from any cluster may be identified and eliminated), or on a class-by-class basis (i.e., data points that are given a particular class, but are remote from a cluster associated with that class, may be identified and eliminated). To perform class-by-class outlier identification, step 208 may include determining, for each of the embeddings and for each of the clusters, a respective class, and designating embeddings that are remote from the cluster associated with the same class as the embeddings as outliers. An example of identification and elimination of outliers will be illustrated and described with respect to FIGS. 5 and 6.

With continued reference to FIG. 2, at step 208, in some embodiments, one or more thresholds may be applied to determine which, and/or how many, data points to designate as outliers and eliminate. For example, in some embodiments, data points that are more than a predetermined threshold distance from a cluster may be designated as outliers and eliminated. Additionally or alternatively, a predetermined threshold percentage of data points (e.g., 5%) that are farthest from clusters may be designated as outliers and eliminated. Additionally or alternatively, a predetermined quantity of data points that are farthest from clusters may be designated as outliers and eliminated.

The method 200 may further include a step 210 that includes continuing to train the machine learning algorithm with the reduced training data set to create a trained prediction model or classifier. Step 210 may include training the first state of the model with the reduced training data set generated at step 208 to generate a second model state. As a result of training on an improved, reduced training data set, the second model state may be a more accurate classifier than the first model state.

The machine learning algorithm may be trained, and/or training data may be further reduced, until such training no longer improves the model, in an embodiment. Accordingly, steps 204, 206, 208, and 210 may be repeated to iteratively train the model, further reduce the training data set, and further train the model with the further reduced training data set.

The method 200 may further include a step 212 that includes applying the trained prediction model (i.e., a "classification model") to a testing set data set, a second set of the labelled data that was not used for training, to classify the testing data set. After testing (or instead of testing), the trained prediction model may be applied to other data sets to classify those data sets. For example, the classification model may be applied to one or more product images to classify the angle of the product in the image (e.g., front-facing, left-facing, etc.). Alternatively, in another example, the classification model may be applied to one or more product images or descriptions to classify the products themselves (e.g., to identify if the products, based on the images, include one or more features that the model identifies, or to determine a category of the product, and the like). The above-noted applications of the classification model are examples only, and numerous other applications are possible and contemplated.

Figure 3:
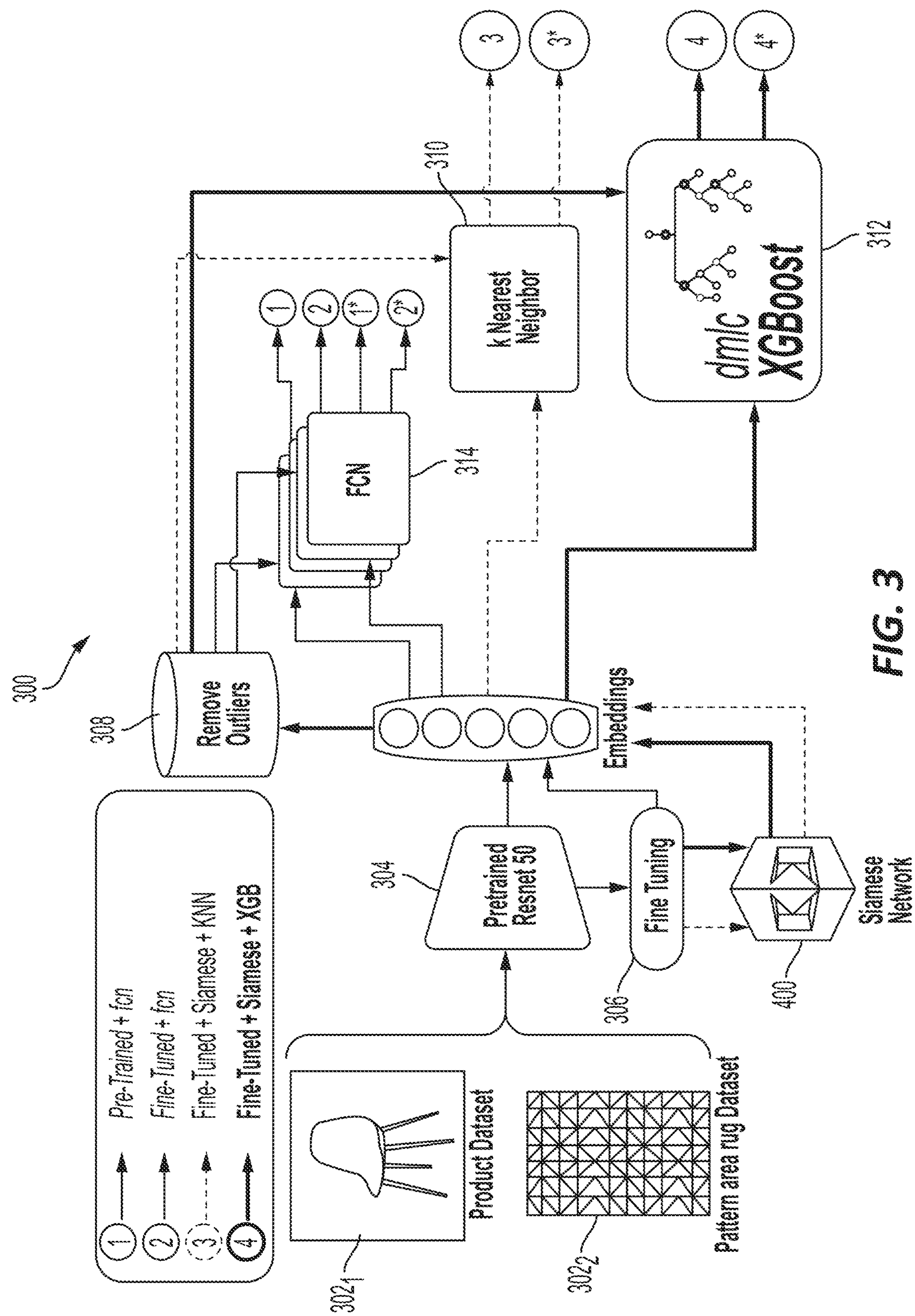
FIG. 3 is a diagram and flow chart illustrating an example method for developing a machine learning model for classifying images.

FIG. 3 is a diagram and flow chart illustrating an example method 300 for developing a machine learning model for classifying images. The method 300 may include an embodiment of steps 202, 204, 26, 208 of the method 200 of FIG. 2. The method 300 may utilize one or more deep convolutional neural networks (CNN), which may be well-suited to learning image representations. A CNN may learn complex features in an image set by stacking several components including convolutional, pooling, and fully connected layers. In some embodiments, the method 300 may include fine-tuning a pre-trained neural network. In other embodiments, a deep neural network may be trained from scratch.

The method 300 may include obtaining one or more training data sets 302 and a pre-trained neural network 304. In the embodiment illustrated in FIG. 3, the data sets 302 include a first, product image data set 302$_1$ that includes a plurality of images of similar products (e.g., chairs) captured from different angles and a second, pattern area rug data set 302$_2$ that includes rugs of different pattern types, and the pre-trained neural network 304 includes a ResNet-50 CNN. In some embodiments, the pre-trained neural network 304 may have been pre-trained on an ImageNet data set.

The method 300 may further include a step 306 in which the pre-trained neural network 304 is fine-tuned using one or more of the training data sets 302. For example, in some embodiments, a respective model may be fine-tuned for each data set 302, so as to create a separate model for each respective feature (e.g., pattern, image angle, etc.) to be classified. In some embodiments, the fine-tuning step 306 may include freezing all copied layers of the neural network from epoch to epoch except the classification layer. In other embodiments, the fine-tuning step 306 may include freezing initial layers of the neural network that train lower level features from epoch to epoch and fine-tuning subsequent layers. Fine-tuning at step 306 may include training the model 304 for a predetermined number of epochs with the selected data set. For example, in some embodiments, the model 304 may be trained for ten (10) epochs, with embeddings extracted from a final layer of the model at each epoch. In some embodiments, a respective version of the model may be stored after each epoch, and the most accurate version of the model may be selected for further improvement according to the method 300. Accuracy may be determined by comparing a respective known class label of each training data point to the model's predictions.

In an embodiment of step 306 that includes a ResNet neural network, the pre-trained network 304 may be fine-tuned by unfreezing all layers in the layer 11 group and after, and embeddings for all training instances are extracted from the avgpool layer.

Figure 4:
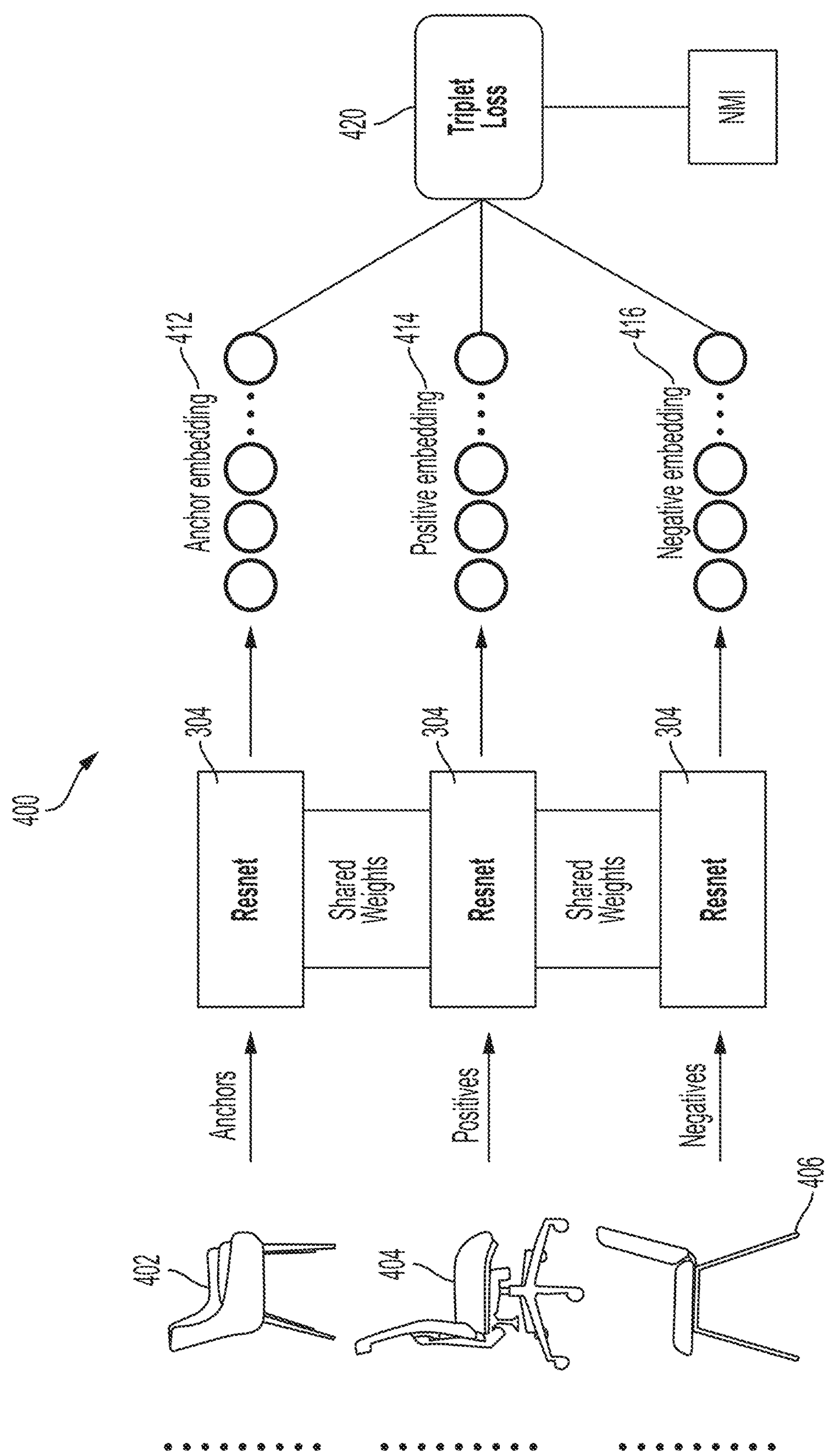
FIG. 4 is a diagrammatic view of an example Siamese neural network.

The method 300 may further include applying a Siamese network 400 to the output of the fine-tuning step 306. FIG. 4 is a diagrammatic view of an example Siamese network 400. Siamese neural networks are artificial neural networks trained for metric learning. Siamese networks share weights and contain identical components that work in tandem to learn to differentiate between inputs. By learning similarity, Siamese neural networks have many applications such as facial recognition, signature verification and even drug discovery. For metric learning, Siamese neural networks with triplet loss may be very efficient because they optimize a distance metric using a distance constraint while enforcing a margin. For each triplet, positive examples are within the same class as the anchor while negative examples are from a different class. A Siamese neural network may increase the separation between embeddings of different classes and reduce separation of embeddings of the same class.

The Siamese neural network 400 of FIG. 4 demonstrates an example of triplet loss applied to an example product view data set. The data set includes a plurality of anchor images 402, a plurality of positive example images 404, and a plurality of negative example images 406. The images 402, 404, 406 may each be input to the model 304 to generate anchor image embeddings 412, positive example embeddings 414, and negative example embeddings 416. A triplet loss function 420 may then be applied to the embeddings 412, 414, 416.

As the size of a training data set comprising the images 402, 404, 406 grows, the quantity of possible triplets increases polynomially. Therefore, applying a triplet mining method that selects examples of adequate difficulty may improve the computational efficiency of the Siamese network 400. In some embodiments, triplets may be selected based on a batch hard mining strategy. For each anchor image in set 402, a batch hard mining strategy may include selecting the positive example in set 404 with the greatest distance and the negative example in set 406 with the least distance. In conjunction with a batch hard mining strategy, the following triple loss function may be minimized:

$$L_{BH} = \overbrace{\sum_{i=1}^{C}\sum_{a=1}^{K_i}}^{all\ anchors}\Bigg[\alpha + \overbrace{\max_{p=1 \ldots K_i} D(f(x_i^a), f(x_i^p))}^{hardest\ positive} \tag{1}$$

$$\underbrace{- \min_{\substack{j=1 \ldots P \\ n=1 \ldots K_i \\ j \neq i}} D\big(f(x_i^a), f\big(x_j^n\big)\big)}_{hardest\ negative}\Bigg]_+ \tag{2}$$

where $x_i^a$ is the anchor image, image $x_i^p$ is a positive image, image $x_j^n$ is a negative image, C is the number of classes in the training data set, $K_i$ is the number of anchors for class i, $D(x,y)=\|x-y\|_2^2$, and f(x) is a mapping that transforms an image to an embedding.

In some embodiments, it may be desirable to select different input examples 402, 404, 406 for each epoch of training. In some embodiments, the input data set may be mined by randomly selecting from the top ten most positive examples (where “most positive” indicates examples within the same class as the anchor and having the furthest distance from the anchor) and top ten most negative examples (where “most negative” indicates examples in different classes from the anchor having the shortest distance from the anchor) for each anchor from the previous epoch. Any appropriate number of the top ten most positive and/or top ten most negative examples may be selected.

The Siamese neural network 400 may further include, after each training epoch, applying a normalized mutual information (NMI) function for cluster evaluation. An NMI score is indicative of cluster quality and how well different classes are separated from each other. For each cluster, the NMI measures how accurately true labels match predicted labels. To calculate NMI, a K-means algorithm may be applied to partition the data and the centroid of each cluster may be initialized by the mean of the embeddings for each class. K-means labels each cluster with its most frequently-occurring class. Cluster purity may be measured by comparing the number of correctly assigned instances to the total number of instances in the data set. High purity is more achievable if the number of clusters is large. NMI accounts for this trade-off by factoring the probabilities of instances belonging to clusters and the entropy of class labels:

$$NMI(\Omega, C) = \frac{2 \times I(\Omega; \mathbb{C})}{[H(\Omega) + H(\mathbb{C})]}$$

where Ω is the set of clusters and C is the set of classes, H(•) indicates entropy, and I(Ω,C) indicates the Mutual Information between Ω and C. In some embodiments, the Siamese neural network may cease training when the NMI score does not continue to increase on subsequent epochs.

Referring again to FIG. 3, the method 300 may further include a step 308 that includes defining clusters and removing outliers from the defined clusters from the data set to create a reduced training data set. Clustering may be applied to divide the data set into useful groups for data analysis, which may be leveraged to detect outliers. Removing outliers from clusters may be applied to raise classification accuracy in subsequent epochs. For example, a density-based clustering algorithm in which the number of clusters are automatically determined, and low-density regions are discarded as outliers, may be applied. DBScan is an example of such a clustering algorithm.

The clustering algorithm may utilize a distance parameter, Epslion (Eps), a minimum number of points per cluster parameter (MinPts). The clustering algorithm may include identifying core points in clusters as points that have at least MinPts within a distance of Eps. Border points may be defined as any points within Eps distance of a core point. Core points and border points within Eps distance may be grouped into the same cluster.

The above-described cluster definition and outlier elimination process does not require that the number of clusters be predetermined. In some embodiments, MinPts and Eps parameter values may be selected to maximize the number of clusters while restricting the minimum number of instances per cluster. For example, in the embodiment of the method 300 illustrated in FIG. 3, MinPts may be set to 20 and 25, respectively, for the Product View and Area Rug Patterns data sets. In an embodiment, a value of the Eps parameter may be validated by performing a grid search of the Eps parameter and modifying its value until the discovered clusters do not increase and the number of outliers do not exceed a threshold (e.g., 5%). After completion of the clustering algorithm, any data points not assigned to clusters may be designated as outliers.

Figure 5:
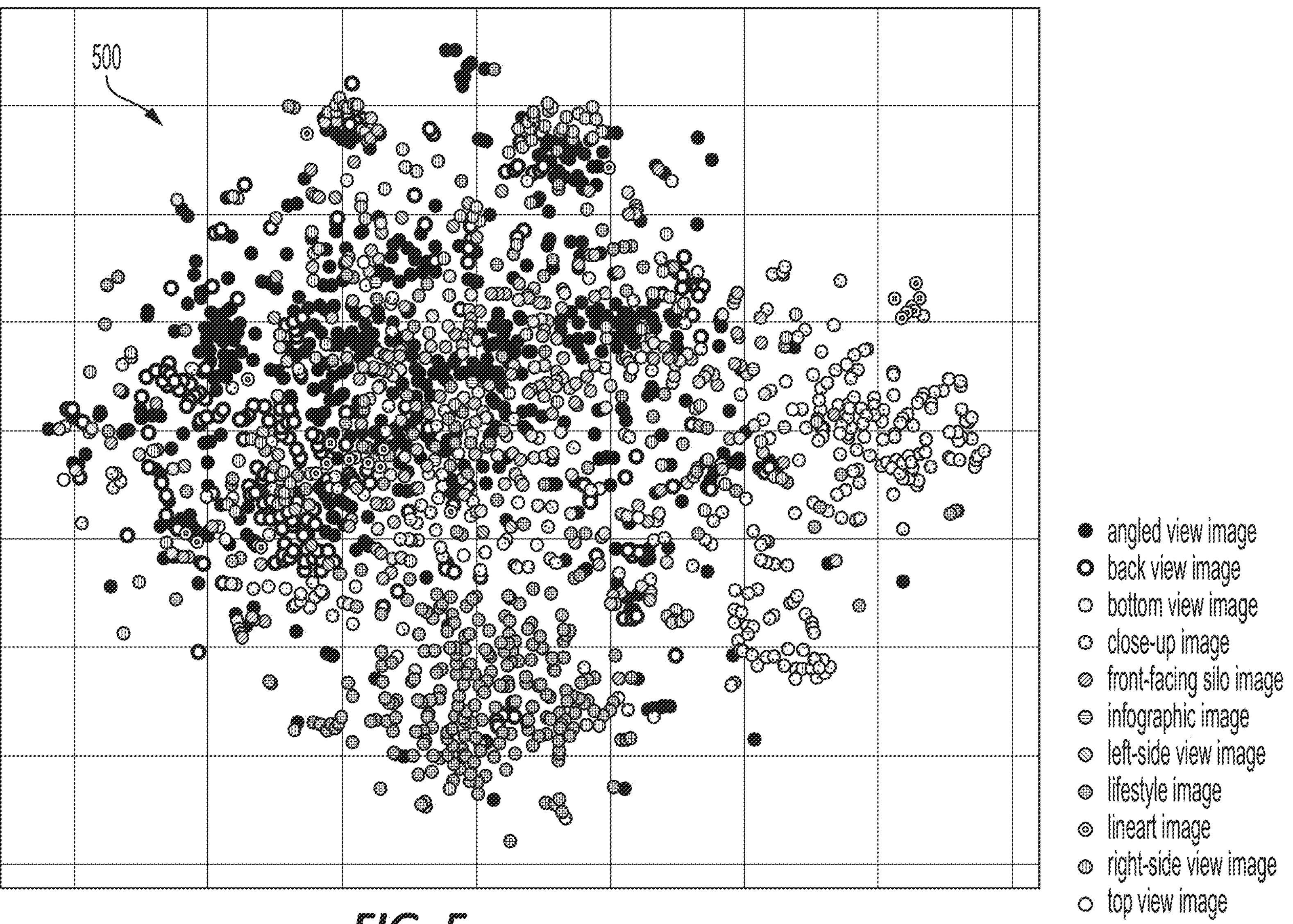
FIG. 5 is a plot illustrating embeddings of an example image data set without application of a clustering algorithm.
Figure 6:
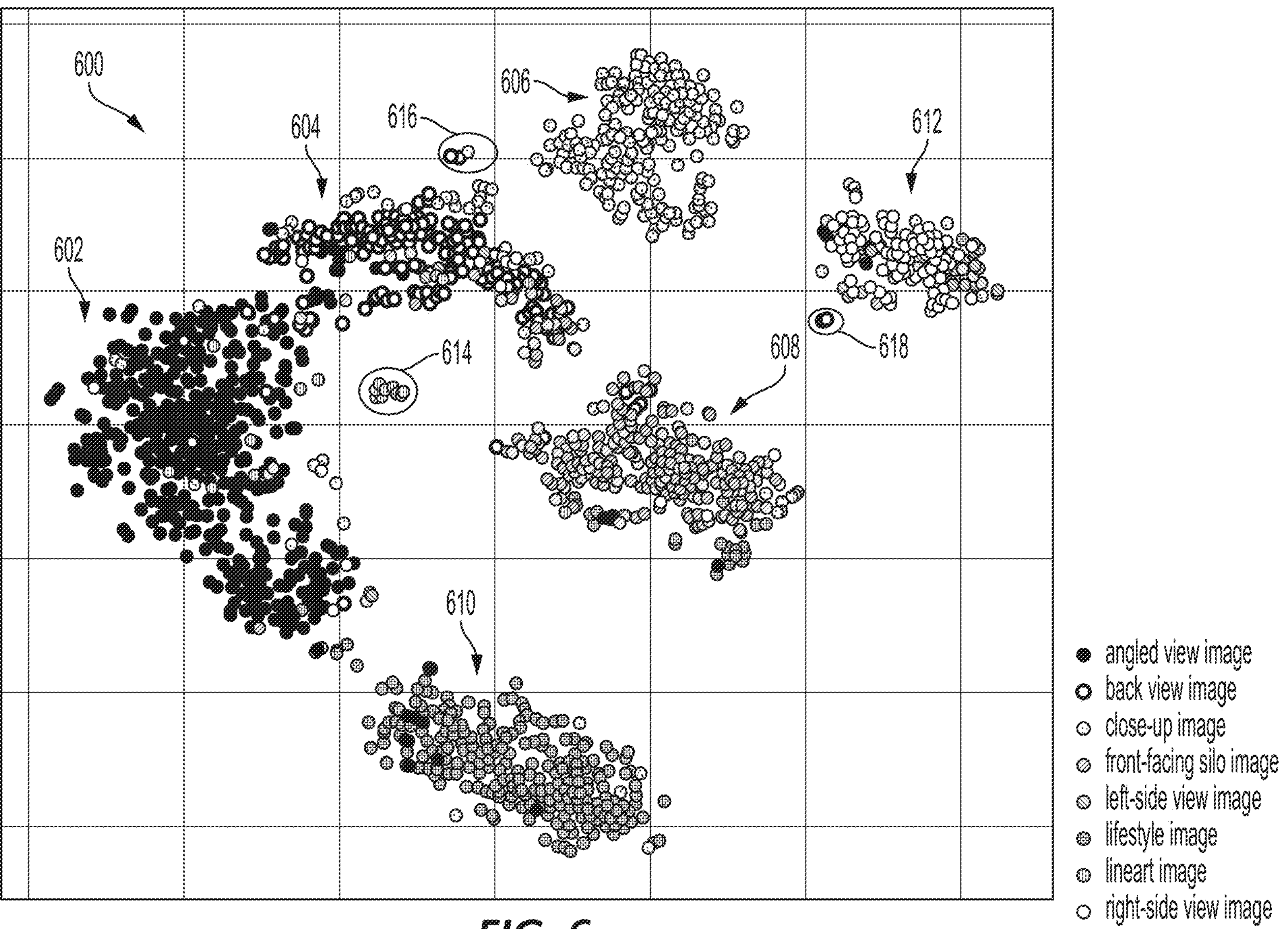
FIG. 6 is a plot illustrating embeddings of an example image data set with application of a clustering algorithm.

FIG. 5 is a plot illustrating embeddings of an example data set without application of a clustering algorithm. FIG. 6 is a plot illustrating embeddings of the same example data set with application of a clustering algorithm. Both FIGS. 5 and 6 include embeddings respective of the image angle data set $\mathbf{302_1}$. The plot 500 of FIG. 5, in which no clustering algorithm was applied, includes embeddings data points from many different angles generally dispersed throughout the data space. In contrast, the plot 600 of FIG. 6, in which a clustering algorithm was applied, includes several defined, distinct clusters, including an angled view image cluster 602, a back view image cluster 604, a close-up image cluster 606, a front-facing image cluster 608, a lifestyle image cluster 610, and a right-side image cluster 612. Images associated with embeddings that are neither core points nor border points for any cluster in the plot 600 may be eliminated from the data set for further training (this is an example of eliminating clusters on a holistic basis). For example, the images associated with the data points within circles 614, 616, 618 may be eliminated, among others.

Deep convolutional neural networks (CNN) may be successful for image classification because of their flexibility in structure with weight sharing and sub-sampling layers. However, there is ambiguity in finding the optimal CNN structure for a problem domain where there are no guidelines for structural parameters. Due to these challenges, a CNN-based image classifier may not yield the highest accuracy achievable. Accordingly, in some embodiments, the method 300 may include testing the model after the Siamese network to simultaneously test if the model furthers the success of outlier detection and raises prediction accuracy compared to only a CNN-based approach.

The method 300 may include two classifiers for testing after the Siamese neural network. First, a K-Nearest Neighbors classifier 310 may be applied. K-Nearest Neighbors assigns a sample to the class that is most common amongst the nearest neighbors. A value of K may be selected as appropriate for a given embodiment. For example, K may be set to fifteen (15). Nearest neighbors may be found by calculating the Euclidean distance of embeddings from the sample to clusters following Siamese network training. Outliers may be removed as described above to test for improvements in prediction accuracy.

Second, an XGBoost classifier may be applied. XGBoost is an optimized distributed gradient boosting library designed to be highly efficient, flexible and portable. It implements machine learning algorithms under the Gradient Boosting framework. XGBoost is an effective ensemble learning algorithm that can transform several weak classifiers into a strong classifier. Gradient Tree Boosting trains weak learners in an additive manner.

The features for XGBoost may be created by the distances of samples to clusters learned by the Siamese neural network. The cosine similarity between a sample and the mean embedding for every cluster may be calculated. After features are constructed, they may be input to XGBoost for classification. Outliers may be removed subsequently to test if classification improves.

The method 300 may further include a fully-connected network layer 314. The fully connected layer may be a classifier that fully connects every class to every dimension of the embedding. The fully connected layer 314 may be applied as an alternative to XGBoost, for example.

As illustrated in FIG. 3, various combinations of K-nearest neighbors, XGBoost, and a fully-connected network may be applied to evaluate model versions and select a model for deployment or application to further data sets.

Experimental Setup. Experiments were conducted with method 300 using two distinct image data sets. The first data set contains images of 8 classes showing different views of chair furniture: product (front, back, left, right, angled), lifestyle, close-up, and line art. The second data set contains images of 12 patterns of area rugs (e.g. geometric, floral, striped, solid, chevron, animal prints).

Each of the two experimental data sets was subjected to the same iterative process utilizing a ResNet-50 neural network with 4 separate experiments. Each experiment is indicated in FIG. 3. For the first experiment, a ResNet-50 network pre-trained on Imagenet data was used to generate embeddings for training images. These embeddings were then trained with a fully-connected network for label prediction. In the second experiment, only layers before layer 1 were frozen while all subsequent layers were fine-tuned. The third experiment utilized the embeddings generated from the 2nd experiment to train a Siamese neural network. Classification was conducted by using the K-Nearest Neighbor distance to clusters generated by the Siamese neural network. The fourth experiment utilized embeddings generated from the Siamese neural network, but instead of classifying with K-Nearest Neighbors, it used an XGBoost classifier. To highlight the importance of selection of training examples, each experiment tested if accuracy is raised after using DB Scan to remove outliers.

Experimental Results. The embeddings for pre-trained, fine-tuned and Siamese networks were clustered using the K-means algorithm. The NMI score was calculated for both data sets for each embedding type. The NMI score significantly increased from pre-trained to fine-tuned networks and also from fine-tuned to Siamese networks. NMI reached as high as 0.605 for the Product Views data set and 0.419 for Area Rug Patterns data set following Siamese neural network training (Table 1, below).

TABLE 1

| Embeddings from | Normalized Mutual Product Views | Information (NMI) Area Rug Patterns |
|---|---|---|
| Pre-trained | 0.181 | 0.126 |
| Fine-tuned | 0.289 | 0.301 |
| Fine-tuned + SN | 0.605 | 0.419 |

Prediction accuracy was tested for four separate classification problems without outlier removal. The pre-trained networks without fine-tuning performed the worst on both data sets. Finetuning was 10% more accurate on the product views data set and almost 20% more accurate on the area rug patterns data set. After Siamese network training, K-Nearest Neighbors was able to raise accuracy nearly 12% on both data sets. This is especially informative, because the area rug pattern data set was not able to reach as high NMI for its clustering quality (Table 1). With a more sophisticated classifier, XGBoost achieved the highest accuracy with 90.7% on the product view data set and 87.4% on the area rug pattern data set (Table 2, below).

TABLE 2

| | Accuracy (%) | | | |
|---|---|---|---|---|
| | Product Views | | Area Rug Patterns | |
| Experiment | Full | Reduced | Full | Reduced |
| Pre-trained + FCN | 65.3 | 64.8 | 55.9 | 54.1 |
| Fine-tuned + FCN | 75.7 | 75.1 | 74.5 | 72.2 |
| Fine-tuned + SN + KNN | 87.2 | 89.3 | 86.2 | 87.7 |
| Fine-tuned + SN + XGB | 90.7 | 92.6 | 87.4 | 89.1 |

For all four experiments, the effects of outlier removal were evaluated. A range of 3% to 5% of outliers were removed based on the embeddings from the pre-trained, fine-tuned, and Siamese networks respectively. This had a negative influence on the performance of the first two approaches where accuracy dropped 0.5%-2.3%. However, performance improved significantly for classifiers leveraging embeddings from Siamese networks. Accuracy of K-Nearest Neighbors and XGBoost classifiers raised 1%-2% on both data sets after outlier removal.

Experiments found that fine-tuning pre-trained networks performed significantly higher than copying all layers. Further experiments illustrated that the use of second-stage classifiers (e.g., a Siamese network), instead of only a single advanced neural network, can improve classification accuracy. By subsequently training Siamese networks, outliers were identified more effectively and classifier performance was raised in all cases relative to use of a single CNN. Additionally, when integrating CNNs with a powerful gradient boosting algorithm, results also improved substantially.

Figure 7:
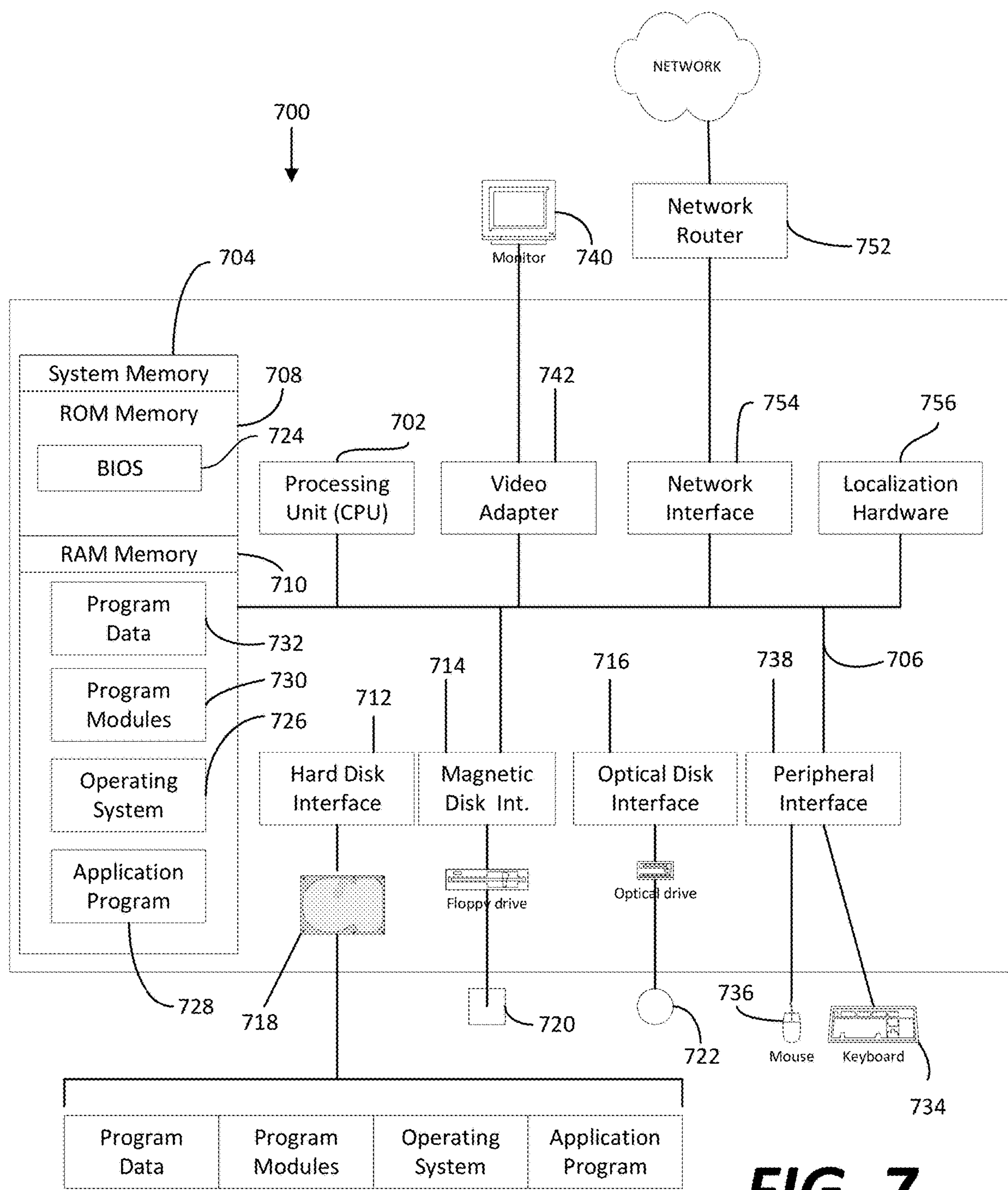
FIG. 7 is a diagrammatic view of an example embodiment of a user computing environment.

FIG. 7 is a diagrammatic view of an example embodiment of a user computing environment that includes a general purpose computing system environment 700, such as a desktop computer, laptop, smartphone, tablet, or any other such device having the ability to execute instructions, such as those stored within a non-transient, computer-readable medium. Furthermore, while described and illustrated in the context of a single computing system 700, those skilled in the art will also appreciate that the various tasks described hereinafter may be practiced in a distributed environment having multiple computing systems 700 linked via a local or wide-area network in which the executable instructions may be associated with and/or executed by one or more of multiple computing systems 700.

In its most basic configuration, computing system environment 700 typically includes at least one processing unit 702 and at least one memory 704, which may be linked via a bus 706. Depending on the exact configuration and type of computing system environment, memory 704 may be volatile (such as RAM 710), non-volatile (such as ROM 708, flash memory, etc.) or some combination of the two. Computing system environment 700 may have additional features and/or functionality. For example, computing system environment 700 may also include additional storage (removable and/or non-removable) including, but not limited to, magnetic or optical disks, tape drives and/or flash drives. Such additional memory devices may be made accessible to the computing system environment 700 by means of, for example, a hard disk drive interface 712, a magnetic disk drive interface 714, and/or an optical disk drive interface 316. As will be understood, these devices, which would be linked to the system bus 706, respectively, allow for reading from and writing to a hard disk 718, reading from or writing to a removable magnetic disk 720, and/or for reading from or writing to a removable optical disk 722, such as a CD/DVD ROM or other optical media. The drive interfaces and their associated computer-readable media allow for the nonvolatile storage of computer readable instructions, data structures, program modules and other data for the computing system environment 700. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 700.

A number of program modules may be stored in one or more of the memory/media devices. For example, a basic input/output system (BIOS) 724, containing the basic routines that help to transfer information between elements within the computing system environment 700, such as during start-up, may be stored in ROM 708. Similarly, RAM 710, hard drive 718, and/or peripheral memory devices may be used to store computer executable instructions comprising an operating system 726, one or more applications programs 728 (which may include the functionality of the machine learning system 104 of FIG. 1, for example), other program modules 730, and/or program data 722. Still further, computer-executable instructions may be downloaded to the computing environment 700 as needed, for example, via a network connection.

An end-user may enter commands and information into the computing system environment 700 through input devices such as a keyboard 734 and/or a pointing device 736. While not illustrated, other input devices may include a microphone, a joystick, a game pad, a scanner, etc. These and other input devices would typically be connected to the processing unit 702 by means of a peripheral interface 738 which, in turn, would be coupled to bus 306. Input devices may be directly or indirectly connected to processor 702 via interfaces such as, for example, a parallel port, game port, firewire, or a universal serial bus (USB). To view information from the computing system environment 700, a monitor 740 or other type of display device may also be connected to bus 706 via an interface, such as via video adapter 732. In addition to the monitor 740, the computing system environment 700 may also include other peripheral output devices, not shown, such as speakers and printers.

The computing system environment 700 may also utilize logical connections to one or more computing system environments. Communications between the computing system environment 700 and the remote computing system environment may be exchanged via a further processing device, such a network router 752, that is responsible for network routing. Communications with the network router 752 may be performed via a network interface component 754. Thus, within such a networked environment, e.g., the Internet, World Wide Web, LAN, or other like type of wired or wireless network, it will be appreciated that program modules depicted relative to the computing system environment 700, or portions thereof, may be stored in the memory storage device(s) of the computing system environment 700.

The computing system environment 700 may also include localization hardware 786 for determining a location of the computing system environment 700. In embodiments, the localization hardware 756 may include, for example only, a GPS antenna, an RFID chip or reader, a WiFi antenna, or other computing hardware that may be used to capture or transmit signals that may be used to determine the location of the computing system environment 300.

The computing environment 700, or portions thereof, may comprise one or more components of the system 100 of FIG. 1, in embodiments.

In a first aspect of the present disclosure, a method for machine learning-based classification is provided. The method may include training a machine learning model with a full training data set, the full training data set comprising a plurality of data points, to generate a first model state of the machine learning model, generating respective embeddings for the data points in the full training data set with the first model state of the machine learning model, and applying a clustering algorithm to the respective embeddings to generate one or more clusters of the embeddings. The method may further include identifying outlier embeddings from the one or more clusters of the embeddings, generating a reduced training data set comprising the full training data set less the data points associated with the outlier embeddings, training the machine learning model with the reduced training data set to a second model state, and applying the second model state to one or more data sets to classify the one or more data sets.

In an embodiment of the first aspect, applying the second model state to classify one or more data sets comprises applying the second model state to classify one or more images.

In an embodiment of the first aspect, the method further comprises applying a distance learning algorithm to the respective embeddings to create a distanced embeddings set, wherein applying a clustering algorithm to the respective embeddings comprises applying the clustering algorithm to the distanced embeddings set.

In an embodiment of the first aspect, identifying outlier embeddings from the one or more clusters of the embeddings comprises designating embeddings that are remote from all of the one or more clusters as outlier embeddings.

In an embodiment of the first aspect, identifying outlier embeddings from the one or more clusters of the embeddings comprises designating embeddings that are remote from a single cluster of embeddings as outlier embeddings.

In an embodiment of the first aspect, identifying outlier embeddings from the one or more clusters of the embeddings comprises determining a respective category associated with each of the embeddings, determining a respective category associated with each cluster of embeddings, and designating embeddings that are remote from a cluster of embeddings associated with the category with which the embeddings are associated as outlier embeddings.

In an embodiment of the first aspect, identifying outlier embeddings from the one or more clusters of the embeddings comprises identifying at least a predetermined percentage of embeddings as outlier embeddings, identifying at least a predetermined quantity of embeddings as outlier embeddings, or identifying embeddings that are a predetermined distance from one of the one or more clusters as outlier embeddings.

In an embodiment of the first aspect, training the machine learning model with the reduced training data set comprises training the first model state of the machine learning model with the reduced training data set.

In a second aspect of the present disclosure, a system for machine learning-based classification is provided. The system includes a processor and a non-transitory, computer-readable memory storing instructions that, when executed by the processor, cause the processor to obtain training data comprising a full training data set, train a machine learning model with the full training data set to a first model state, generate respective embeddings for the data points in the full training data set with the first model state of the machine learning model, apply a clustering algorithm to the respective embeddings to generate one or more clusters of the embeddings, identify outlier embeddings from the one or more clusters of the embeddings, generate a reduced training data set comprising the full training data set less the data points associated with the outlier embeddings, train the machine learning model with the reduced training data set to a second model state, and apply the second model state to one or more data sets to classify the one or more data sets.

In an embodiment of the second aspect, applying the second model state to classify one or more data sets comprises applying the second model state to classify one or more images.

In an embodiment of the second aspect, the memory stores further instructions that, when executed by the processor, cause the processor to apply a distance learning algorithm to the respective embeddings to create a distanced embeddings set, wherein applying a clustering algorithm to the respective embeddings comprises applying the clustering algorithm to the distanced embeddings set.

In an embodiment of the second aspect, identifying outlier embeddings from the one or more clusters of the embeddings comprises designating embeddings that are remote from all of the one or more clusters as outlier embeddings.

In an embodiment of the second aspect, identifying outlier embeddings from the one or more clusters of the embeddings comprises designating embeddings that are remote from a single cluster of embeddings as outlier embeddings.

In an embodiment of the second aspect, identifying outlier embeddings from the one or more clusters of the embeddings comprises determining a respective category associated with each of the embeddings, determining a respective category associated with each cluster of embeddings, and designating embeddings that are remote from a cluster of embeddings associated with the category with which the embeddings are associated as outlier embeddings.

In an embodiment of the second aspect, identifying outlier embeddings from the one or more clusters of the embeddings comprises identifying at least a predetermined percentage of embeddings as outlier embeddings, identifying at least a predetermined quantity of embeddings as outlier embeddings, or identifying embeddings that are a predetermined distance from one of the one or more clusters as outlier embeddings.

In an embodiment of the second aspect, training the machine learning model with the reduced training data set comprises training the first model state of the machine learning model with the reduced training data set.

In a third aspect of the present disclosure, a machine learning-based method of classifying a plurality of images is provided. The method may include training a machine learning model with a full training data set, the full training data set comprising a plurality of paired images and classes, to generate a first model state of the machine learning model, generating respective embeddings for the images in the full training data set with the first model state of the machine learning model, applying a clustering algorithm to the respective embeddings to generate one or more clusters of the embeddings, identifying outlier embeddings from the one or more clusters of the embeddings, generating a reduced training data set comprising the full training data set less the images associated with the outlier embeddings, training the machine learning model with the reduced training data set to a second model state, and applying the second model state to one or more unclassified images to classify the one or more unclassified images.

In an embodiment of the third aspect, training the machine learning model with the reduced training data set comprises training the first model state of the machine learning model with the reduced training data set.

In an embodiment of the third aspect, identifying outlier embeddings from the one or more clusters of the embeddings comprises designating embeddings that are remote from all of the one or more clusters as outlier embeddings, or designating embeddings that are remote from a single respective cluster of embeddings as outlier embeddings.

In an embodiment of the third aspect, identifying outlier embeddings from the one or more clusters of the embeddings comprises determining a respective category associated with each of the embeddings, determining a respective category associated with each cluster of embeddings, and designating embeddings that are remote from a cluster of embeddings associated with the category with which the embeddings are associated as outlier embeddings.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method for machine learning-based classification, the method comprising:

generating, via a pre-trained machine learning model, respective embeddings for data points in a training data set used to pre-train the pre-trained machine learning model;

applying a clustering algorithm to the respective embeddings to generate a plurality of clusters of the embeddings;

identifying outlier embeddings from the plurality of clusters of the embeddings;

generating a reduced training data set comprising the full training data set less the data points associated with the outlier embeddings, the reduced training data set including the data points associated with embeddings in the plurality of clusters;

tuning the pre-trained machine learning model with the reduced training data set; and applying the tuned pre-trained machine learning model to one or more data sets to classify the one or more data sets.

2. The method of claim 1, wherein applying the tuned pre-trained machine learning model to classify one or more data sets comprises applying the tuned pre-trained machine learning model to classify one or more images.

3. The method of claim 1, further comprising:

applying a distance learning algorithm to the respective embeddings to create a distanced embeddings set;

wherein applying a clustering algorithm to the respective embeddings comprises applying the clustering algorithm to the distanced embeddings set.

4. The method of claim 1, wherein identifying outlier embeddings from the plurality of clusters of the embeddings comprises:

designating embeddings that are remote from a single cluster of embeddings as outlier embeddings; or designating embeddings that are remote from all of the plurality of clusters as outlier embeddings.

5. The method of claim 1, wherein identifying outlier embeddings from the plurality of clusters of the embeddings comprises:

determining a respective category associated with each of the embeddings;

determining a respective category associated with each cluster of embeddings; and designating embeddings that are remote from a cluster of embeddings associated with the category with which the embeddings are associated as outlier embeddings.

6. The method of claim 1, wherein identifying outlier embeddings from the plurality of clusters of the embeddings comprises:

identifying at least a predetermined percentage of embeddings as outlier embeddings;

identifying at least a predetermined quantity of embeddings as outlier embeddings; or identifying embeddings that are a predetermined distance from one of the plurality of clusters as outlier embeddings.

7. The method of claim 1, wherein tuning the pre-trained machine learning model with the reduced training data set comprises:

training, for a plurality of epochs, the pre-trained machine learning model with the reduced training data set;

storing a respective version of the pre-trained machine learning model for each epoch; and determining the tuned pre-trained machine learning model as the respective version with a highest accuracy.

8. The method of claim 7, wherein determining the tuned pre-training model as the respective version with the highest accuracy comprises:

retrieving an image and a classification label associated with the image;

generating, by each of the respective versions of the pre-trained machine learning model, a predicted classification label for the retrieved image; and determining an accuracy of each of the respective versions as a difference between the retrieved classification label and the respective predicted classification label.

9. A system for machine learning-based classification, the system comprising:

a processor; and a non-transitory, computer-readable memory storing instructions that, when executed by the processor, cause the processor to:

generate, via a machine learning model pre-trained in a first model state, respective embeddings for data points in a full training data set used to pre-train the machine learning model;

apply a clustering algorithm to the respective embeddings to generate a plurality of clusters of the embeddings;

identify outlier embeddings from the plurality of clusters of the embeddings;

generate a reduced training data set comprising the full training data set less the data points associated with the outlier embeddings, the reduced training data set including the data points associated with embeddings in the plurality of clusters;

train the machine learning model with the reduced training data set to a second model state; and apply the second model state to one or more data sets to classify the one or more data sets.

10. The system of claim 9, wherein applying the second model state to classify one or more data sets comprises applying the second model state to classify one or more images.

11. The system of claim 9, wherein the memory stores further instructions that, when executed by the processor, cause the processor to:

apply a distance learning algorithm to the respective embeddings to create a distanced embeddings set;

wherein applying a clustering algorithm to the respective embeddings comprises applying the clustering algorithm to the distanced embeddings set.

12. The system of claim 9, wherein identifying outlier embeddings from the plurality of clusters of the embeddings comprises:

designating embeddings that are remote from a single cluster of embeddings as outlier embeddings; or designating embeddings that are remote from all of the plurality of clusters as outlier embeddings.

13. The system of claim 9, wherein identifying outlier embeddings from the plurality of clusters of the embeddings comprises:

determining a respective category associated with each of the embeddings;

determining a respective category associated with each cluster of embeddings; and designating embeddings that are remote from a cluster of embeddings associated with the category with which the embeddings are associated as outlier embeddings.

14. The system of claim 9, wherein identifying outlier embeddings from the plurality of clusters of the embeddings comprises:

identifying at least a predetermined percentage of embeddings as outlier embeddings;

identifying at least a predetermined quantity of embeddings as outlier embeddings; or identifying embeddings that are a predetermined distance from one of the plurality of clusters as outlier embeddings.

15. The system of claim 9, wherein training the machine learning model with the reduced training data set comprises:

training, for a plurality of epochs, the machine learning model with the reduced training data set;

storing a respective version of the machine learning model for each epoch; and determining the second model state as the respective version with a highest accuracy.

16. The system of claim 15, wherein determining the second model state as the respective version with the highest accuracy comprises:

retrieving an image and a classification label associated with the image;

generating, by each of the respective versions of the machine learning model, a predicted classification label for the retrieved image; and determining an accuracy of each of the respective versions as a difference between the retrieved classification label and the respective predicted classification label.

17. A machine learning-based method of classifying a plurality of images, the method comprising:

generating, via a machine learning model, respective embeddings for images in a full training data set used to pre-train the machine learning model;

applying a clustering algorithm to the respective embeddings to generate a plurality of clusters of the embeddings;

identifying outlier embeddings from the plurality of clusters of the embeddings;

generating a reduced training data set comprising the full training data set less the images associated with the outlier embeddings, the reduced training data set including the images associated with the embeddings in the plurality of clusters;

tuning the machine learning model with the reduced training data set; and applying the tuned machine learning model to one or more unclassified images to classify the one or more unclassified images.

18. The method of claim 17, wherein training the machine learning model with the reduced training data set comprises training each epoch of a plurality of epochs of the machine learning model with the reduced training data set;

storing a respective version of the machine learning model for each trained epoch; and determining the tuned machine learning model as the respective version with a highest accuracy.

19. The method of claim 17, wherein identifying outlier embeddings from the plurality of clusters of the embeddings comprises:

designating embeddings that are remote from all of the plurality of clusters as outlier embeddings; or designating embeddings that are remote from a single respective cluster of embeddings as outlier embeddings.

20. The method of claim 17, wherein identifying outlier embeddings from the plurality of clusters of the embeddings comprises:

determining a respective category associated with each of the embeddings;

determining a respective category associated with each cluster of embeddings; and designating embeddings that are remote from a cluster of embeddings associated with the category with which the embeddings are associated as outlier embeddings.

* * * * *